United States Patent

Szpak et al.

(10) Patent No.: US 7,853,922 B1
(45) Date of Patent: *Dec. 14, 2010

(54) DATA OBJECTS FOR MODEL-BASED DESIGN

(75) Inventors: Pete Szpak, Newton, MA (US); Paul Jackson, Wellesley, MA (US); Peter Mott, Worcester, MA (US)

(73) Assignee: The MathWorks, Inc., Natick, MA (US)

( * ) Notice: Subject to any disclaimer, the term of this patent is extended or adjusted under 35 U.S.C. 154(b) by 981 days.

This patent is subject to a terminal disclaimer.

(21) Appl. No.: 09/859,071

(22) Filed: May 15, 2001

(51) Int. Cl.
G06F 9/44 (2006.01)
G06G 7/62 (2006.01)
(52) U.S. Cl. .......................... 717/105; 717/106; 703/13
(58) Field of Classification Search ............... 703/1–22; 717/104
See application file for complete search history.

(56) References Cited

U.S. PATENT DOCUMENTS

| | | | |
|---|---|---|---|
| 5,477,474 A * | 12/1995 | Southgate et al. ............. 703/15 |
| 5,487,018 A * | 1/1996 | Loos et al. ..................... 716/11 |
| 5,758,160 A * | 5/1998 | McInerney et al. ........... 717/104 |
| 5,875,331 A * | 2/1999 | Lindsey ....................... 717/108 |
| 6,061,721 A | 5/2000 | Ismael et al. ................. 709/223 |
| 6,230,160 B1 | 5/2001 | Chan et al. ............... 707/103 X |
| 6,230,315 B1 * | 5/2001 | Nicholas ...................... 717/104 |
| 6,282,699 B1 | 8/2001 | Zhang et al. ................. 717/109 |
| 6,289,395 B1 | 9/2001 | Apte et al. ................... 709/318 |
| 6,854,120 B1 * | 2/2005 | Lo et al. ...................... 719/311 |

OTHER PUBLICATIONS

Marc E. Herniter, "Schematic capture with MicroSim Pspice", 1996, Prentice Hall, 2nd ed., p. 47-49, 230-237, 255-262 and 418-419.*
Rath, et al., A Novel Approach to the Design and Implementation of a Power Electronics Simulation Software Package, 1997, IEEE Pub No. 0-8186-7873-9/97, pp. 473-476.*
Craig, Extensible Hierarchical Object-Oriented Logic Simulation with an Adaptable Graphical Inerface, 1996, Thesis: Memorial Univ. of Newfoundland, pp. 1-183.*
IBM Technical Disclosure Bulletin, Generating Event Adapters to Facilitate Connections Between Java Beans, Jan. 1, 1998, p. 1-3.
John Henry Moore, Microsoft's New, Improved Proxy Server, Dec. 1997, p. 1-3.
Samir B. Gehani, A Java Based Framework for Explicitly Partitioning, 1997, Section 3.1 Java Beans.
Tiernan, "An Efficient Search Algorithm to Find the Elementary Circuits of a Graph", Comm. of the ACM,.13:722-726, (1970).

(Continued)

*Primary Examiner*—James Rutten
(74) *Attorney, Agent, or Firm*—Nelson Mullins Riley & Scarborough LLP; Kevin J. Canning

(57) ABSTRACT

A method of defining data objects for use with an executable block diagram modeling and code generation system including providing pre-defined data object classes, each of the pre-defined data classes having default attributes, extending the pre-defined data object classes with subclasses, each of the subclasses having user-defined attributes and generating data objects, which are instances of the pre-defined classes and the subclasses.

23 Claims, 2 Drawing Sheets

OTHER PUBLICATIONS

Tarjan, "Depth-First Search and Linear Graph Algorithms", SIAM *J. Comp.*, 1:146-160, Jun. (1972).

Tarjan, "Enumeration of the Elementary Circuits of a Directed Graph" *Cornell University Technical Report TR* 72-145 (1972).

Weinblatt, "A New Search Algorithm for Finding the Simple Cycles of a Finite Directed Graph", *JACM* 19:43-56 Jan. 1972.

David M. Gay, Symbolic-Algebraic Computations in a Modeling Language for Mathematical Programming, Nov. 1999, Schloss Dagstuhl, p. 4-7.

Hartmut Pohlheim, Genetic and Evolutionary Algorithm Toolbox for use with MATLAB, Jul. 1997.

\* cited by examiner

DATA OBJECTS FOR MODEL-BASED DESIGN

TECHNICAL FIELD

This invention relates to data objects for model-based design.

BACKGROUND

Object-oriented applications organize data and routines together into encapsulated units generally referred to as objects. Object-oriented applications lead to modular software systems that have increased flexibility and are easy to alter and maintain.

An object model is a formal description of an object-oriented application. Semantic elements of an object model describe object classes, attributes of object classes, relationships between object classes and inheritance between object classes. One example object-oriented application is block diagram modeling. Dynamic real-world systems such as electrical circuits, shock absorbers, braking systems, and many other electrical, mechanical and thermodynamic systems may be modeled, simulated and analyzed on a computer system using block diagram modeling. Block diagram modeling graphically depicts time-dependent mathematical relationships among a system's inputs, states and outputs, typically for display on a graphical user interface (GUI). Block diagram modeling may also be used to simulate the behavior of a system for a specified time span. Block diagram modeling can also be used to design the algorithms to control the real-world systems being modeled.

SUMMARY

In an aspect the invention features a method of defining data objects for use with an executable block diagram modeling and code generation system including providing pre-defined data object classes, each of the pre-defined data classes having default attributes, extending the pre-defined data object classes with subclasses, each of the subclasses having user-defined attributes and generating data objects, which are instances of the pre-defined classes and the subclasses.

One or more of the following features may also be included. The method may further include storing the data objects and the subclasses. The method may further include the generation of data objects by loading information from an external database through a data exchange interface. The method may further include generating executable code from the executable block diagram system, the executable code containing the attributes of the extended pre-defined data objects with subclasses. The executable code runs on a target processor. The method may further include generating executable code from the executable block diagram system, the executable code containing the attributes of the extended pre-defined data objects with subclasses and pre-defined data objects from the external database. The method of claim 6 wherein the executable code runs on a target processor. The method may further include generating a report containing the data object classes and subclasses used in the executable block diagram modeling system.

In another aspect the invention features a method of block diagram modeling including providing pre-defined data object classes, each of the pre-defined data classes having default attributes, extending the pre-defined data object classes with subclasses, each of the subclasses having user-defined attributes, generating instances of the data objects based on the pre-defined classes and the user-defined attributes, providing blocks representing functional entities that operate of the instances of data objects and generating output from the blocks.

One or more of the following features may also be included. The method may further include loading instances of pre-defined data objects from an external database through a data exchange interface. The method may further include generating code including the pre-defined object classes and extended pre-defined object classes with subclasses. Generating code includes the pre-defined object classes, extended pre-defined object classes with subclasses and the pre-defined data objects from the external database.

In another aspect the invention features a block diagram modeling method including simulating a system in a block modeling diagram system using instances of data objects, the data objects based on pre-defined data object classes having default attributes and subclasses having user-defined attributes.

One or more of the following features may also be included. The method may further include defining characteristics of an algorithm from the data objects. The method may further include documenting a form and functionality of the algorithm designed in the block diagram modeling system, including the information captured in the associated data objects. The data objects may be loaded from an external database through a data exchange interface.

In another aspect the invention features an automatic code generation method including generating program code to represent an algorithm designed in a block diagram modeling system, including characteristics of the algorithm defined by the associated data objects.

One or more of the following features may also be included. The method may further include defining characteristics of the code generation method and the resulting generated code from the data objects. The method may further include compiling the generated program code for execution on a target processor. The method may further include combining the generated program code with externally generated and hand-written legacy program code.

Embodiments of the invention may have one or more of the following advantages.

A data object enables a user to fully define the information related to the data to be used with a model-based design environment as part of the data itself, as opposed to having to enter this information into the model in some other manner. The data object is used to define parameter, signal and state information for use in block diagram modeling.

Data objects may be built upon an object-oriented framework giving user the ability to subclass the built-in object classes and thus extend the list of attributes associated with a given parameter, signal or state in a model.

The extensibility of the data objects enable users to generate data object classes that mimic the structure of their own databases, which facilitates a seamless transfer of information both to and from the model-based design environment.

Information stored as part of data is available throughout the design process, enabling users to have a single data definition with all of the information required to fully define their algorithm. This reduces the redundancy, inconsistency and errors associated with having multiple sources or copies of data. The ability to embed references (e.g., pointers/dynamic links) within data objects makes it possible for objects to share common pieces of information, which further reduces redundancy and inconsistency.

Data objects lends itself to the development of secondary tools to further simplify the task of defining, viewing and modifying data associated with a model.

Data objects provide a means for generating code based on information contained within the data object itself.

The block diagram model and generated code inherit attributes from the data associated with the model rather than this information being specified directly in the model itself.

All information specified in the data object is available throughout the model-based design environment and is propagated to all stages of the process. This includes user-extended attributes that are not directly recognized or used by the model-based design tools.

The user has complete control over the structure and attributes associated with data objects through subclassing available through a object-oriented library framework.

Other features and advantages of the invention will become apparent from the following description, including the claims and drawings.

DESCRIPTION OF DRAWINGS

Like reference symbols in the various drawings indicate like elements.

DETAILED DESCRIPTION

Figure 1:
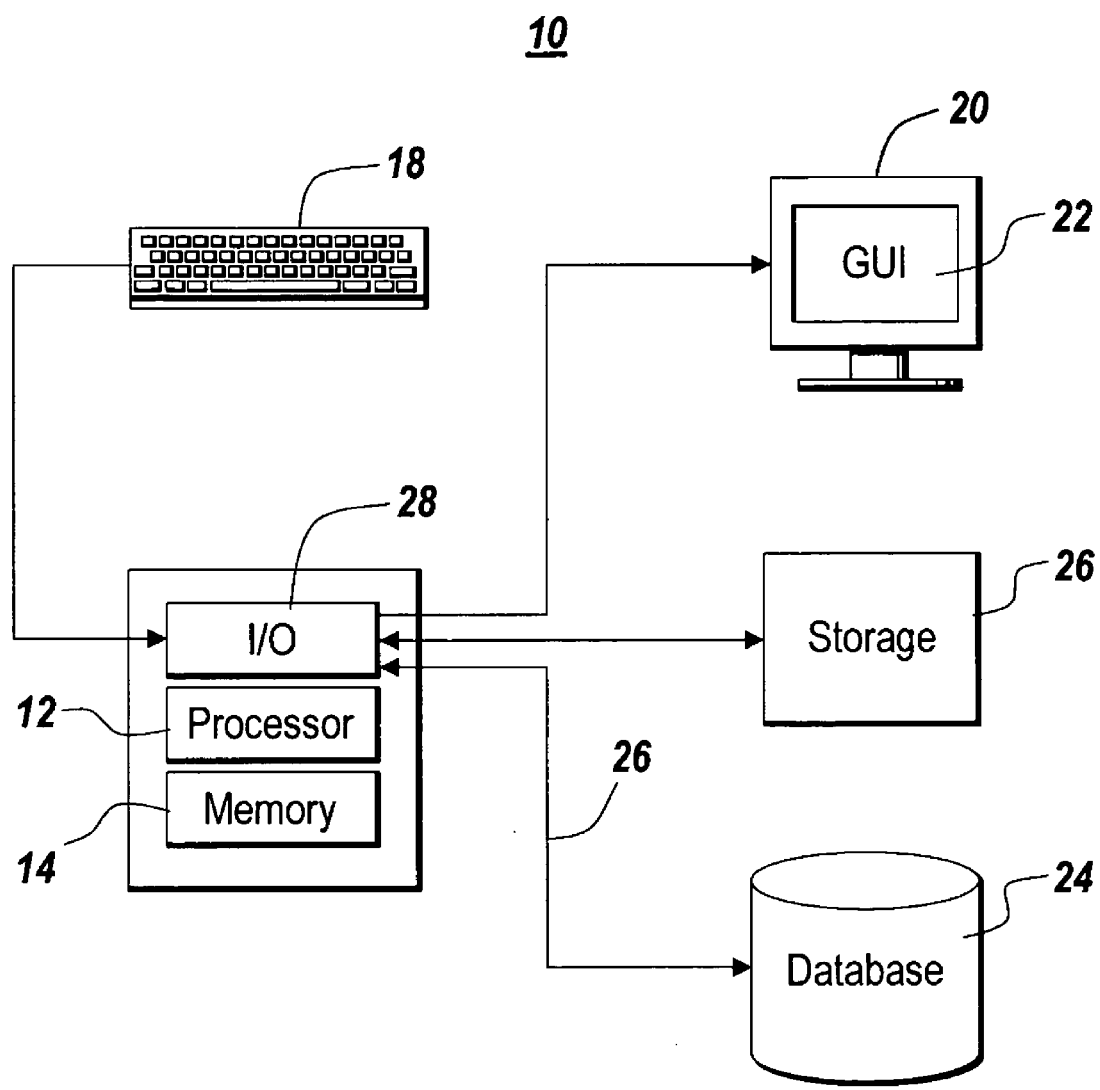
FIG. 1 is a block diagram of an exemplary computer system.

To better understand the invention it is helpful to clarify the general meanings of terms used in connection with object-oriented systems.

An "object class" is a set of data (attributes) and functional capabilities (routines) encapsulated into a single logical entity.

An "object instance" is an embodiment (instantiation) of an object class. Instances are differentiated from one another by their attribute values, but not their routines (capabilities). The term "object" is often used by itself to refer loosely to either an object class or an object instance, the difference being understood in context.

An "object-oriented application" is an operational computer program which when employed on an appropriate computer system uses a set of object instances that work in cooperation to perform useful work.

An "object model" is a set of object classes that together form a blueprint for building an object-oriented application. Each object class of an object model can have attributes, inheritances, and relationships. Object models may be in the form of "logical models" generated by particular modeling tools and employing particular modeling languages, or "unified models" generated by a repository adaptor tool (or the like) and employing a unified modeling language, such as Unified Modeling Language (UML).

A "relationship" defines a link between two object classes.

"Attributes" are data elements of object classes that are expressed through particular values in object instances.

An "object ID" is used to uniquely identify each object instance. The object ID can be generated in one of two ways. It can be generated by the application, which can automatically assign a unique object id for each new object instance. Alternatively, it can comprise a set of attributes that are guaranteed in the object model to always form a unique set of values for an instance. In this case, the create routine will require a unique set of attributes in order to create a new object instance.

A "routine" is a functional capability associated with an object class.

"Inheritance" represents a specialization of an object class in which the specialized class shares all of the attributes and routines of parent classes. Inheritance can extend across many object class "generations."

Inheritance can be "vertical" (concrete) or "horizontal" (abstract) according to how the information corresponding to inherited attributes is stored in the database. In the case of vertical inheritance between two object classes in an object model, the database contains data associated with each object class. In the case of horizontal inheritance between two object classes in the object model, the database does not contain data associated with each object class. Horizontal and vertical inheritance can be mixed within the same object model.

The attributes, inheritances, and relationships of all the object classes of an object model are called the "semantics" or "semantic elements" of the object model. An object model contains certain information associated with its semantics. For each attribute, the object model contains information as to whether that attribute is to be associated with the object ID for the class. For each inheritance, the object model contains information as to whether the inheritance is vertical or horizontal (concrete or abstract).

Example object-oriented languages are C++ and JAVA®.

Referring now to FIG. 1, an exemplary computer system 10 includes a processor 12 coupled to a memory 14, a plurality of storage devices 16, and a user interface 18, 20, such as a keyboard 18 and screen 20 on which a graphical user interface (GUI) 22 is implemented. The processor 12 is also coupled to hardware associated with the at least one database 24. The database 24 may include a further storage device, such as a hard drive or a non-volatile memory; structured data; and a database management system (DBMS). In some examples, the database 24 may have its own associated hardware, including a database processor (not shown) distinct from the above-mentioned processor 12. In other examples the database 24 is a software entity that modifies and is executed by the processor 12, in which case a network 26 may not be present.

Also shown is an input/output section 28 coupled to the processor 12 providing input/output functions and interfacing between the user interface 18, 20, the plurality of storage devices 16, the network 26, and the database 24.

Figure 2:
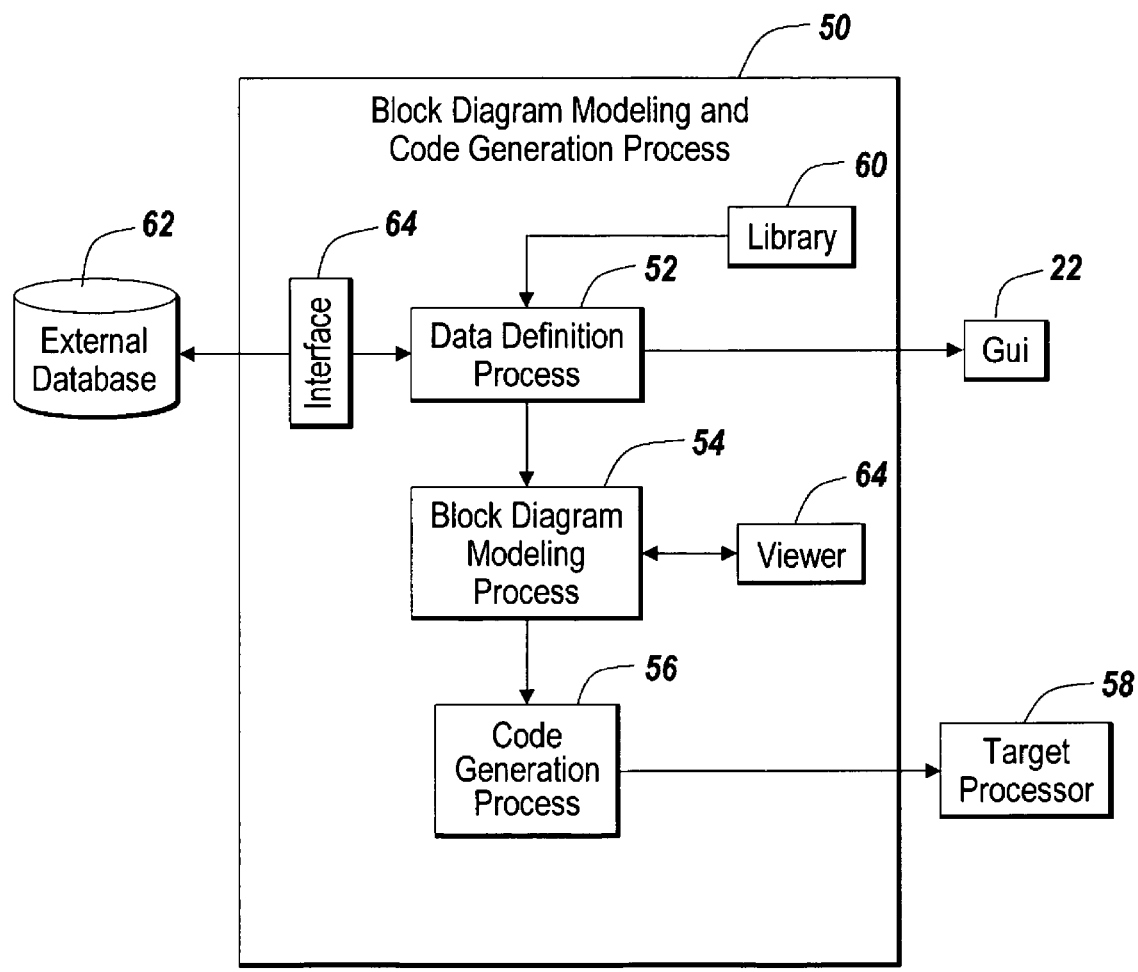
FIG. 2 is a diagram of a block diagram modeling code generation process.

Referring to FIG. 2, a block diagram modeling and code generation process 50 includes a data definition process 52, a block diagram modeling process 54 and a code generation process 56. The data definition process 52 provides a user using the user interface 18, 20 with the capability of defining data (e.g., parameters and signals) that will be used by the block diagram modeling process 54 and the code generation process 56.

The block diagram modeling process 54 graphically depicts time-dependent mathematical relationships among a system's inputs, states and outputs, typically for display on the graphical user interface (GUI) 22. The block diagram modeling process 54 may also be used to simulate the behavior of a system for a specified time span. Further, the block diagram modeling and process 54 can also be used to design the algorithms to control the real-world systems being modeled using the code generation process 56. Specifically, the code generation process 56 writes executable programs in a software language such as C that can execute on a desired target processor 58. An example code generation process 56 is Real Time Workshop® developed by MathWorks and incorporated by reference herein.

As mentioned above, the data definition process 52 provides the user with a GUI 22. The GUI 22 enables the user to fully define data objects with information related to the data to be used by the block diagram modeling process 54 and the code generation process 56. The data objects are used to define parameter, signal and state information. The data objects are built on an object-oriented framework library 60, such as the Unified Data Dictionary (UDD) developed by MathWorks as part of its MATLAB® product, incorporated by reference herein. Data objects represent not only values to be used by the block diagram modeling process 54, but also attributes (e.g., values, storage classes, data types) independent of the block diagram modeling process 54. The object-oriented framework library 60 provides an initial schema. Certain attributes are part of built-in data object classes and are contained in the object-oriented framework library 60. Tools contained in the block diagram recognize these built-in attributes modeling process 54 and can affect both the algorithm being designed and the interpretation of associated data. For example, a parameter object's "value" attribute is used to parameterize a model. The "storage class" attribute is used to define how parameters, signals and states are to be treated during simulation in the block diagram modeling process 54 and during code generation in the code generation process 56. For example, Simulink®, designed by MathWorks and incorporated by reference herein, identifies parameter, signal and state objects by using the same resolution mechanism used for other MATLAB® variables.

In the data definition process 52, the user specifies data attributes for associated data objects that are used in the block modeling process 54 and the code generation process 56. These attributes may be default attributes found in the library 60 and/or user-defined, i.e., customized attributes, specified by the user and application-specific. A set of default data attributes is contained in the parameter signal library 60. The user may generate subclasses of the default data attributes for parameters and signal object classes to represent data attributes resident in an external database 62. The data definition process 52 imports information contained in the user's external database 62 after the user specifies a custom datum, which becomes associated with the data object for use in the block diagram modeling process 54 and the code generation process 56. The data definition process uses one of a plurality of standard interfaces 64 to incorporate the attributes found in the external database 62 with the user specified parameter. Example interfaces are the Oracle® database interface and DBII database interface and correspond to data exchange files published by the external database system providers. Such interfaces to the external data and their corresponding attributes take advantage of the inheritance capability and class structure used in the data definition process 52.

The data objects may be represented in memory 12 in any one of a plurality of software data structures, such as a C language STRUC, i.e., structure, or a JAVA Class, for example. Both default attributes and user specified attributes obtained from the external database 62 are contained in the data object.

Thus, all the information specified by the user in the data object is made available and propagated to the block diagram modeling process 54. This includes user-extended attributes that are not resident in the library 60. Using the data objects specified by the data definition process 52, the block diagram modeling process 54 graphically depicts time-dependent mathematical relationships among a system's inputs, states and outputs, typically for display on the graphical user interface (GUI) 22. Each of the data object's attributes may be viewed by the user on a parameter and signal viewer 64. Both default and user-specified attributes for the data object are displayed on the GUI 22 since the data object and its associated attributes are stored in a single data structure when defined in the data definition process 52.

The fact that all information is stored as part of the data and is available throughout the block diagram modeling process 54 enables the user to have a single data definition with all of the information to fully define the code generated by the code generation process 56.

The block diagram modeling process 54 feeds its modeling information to the code generation process 56 for generation of code for the target process 58. Generated code is based on the information contained within the data object(s). More specifically, built-in attributes from the library 60 are made available during code generation. In addition, all data attributes added/specified by the user in the data definition process 52 are made available. These attributes, both default and custom, are accessed by the code generation process 56 and used to perform specialized customizations and optimizations of code generation for eventual execution of the code on the target processor 58.

Process 50 is not limited to use with the hardware/software configuration of FIG. 1; it may find applicability in any computing or processing environment. Process 50 may be implemented in hardware (e.g., an ASIC {Application-Specific Integrated Circuit} and/or an FPGA {Field Programmable Gate Array}), software, or a combination of hardware and software.

Processes 50 may be implemented using one or more computer programs executing on programmable computers that each includes a processor, a storage medium readable by the processor (including volatile and non-volatile memory and/or storage elements), at least one input device, and one or more output devices.

Each such program may be implemented in a high level procedural or object-oriented programming language to communicate with a computer system. Also, the programs can be implemented in assembly or machine language. The language may be a compiled or an interpreted language.

Each computer program may be stored on a storage medium or device (e.g., CD-ROM, hard disk, or magnetic diskette) that is readable by a general or special purpose programmable computer for configuring and operating the computer when the storage medium or device is read by the computer to perform process 50.

Process 50 may also be implemented as a computer-readable storage medium, configured with a computer program, where, upon execution, instructions in the computer program cause the computer to operate in accordance with process 50.

Further aspects, features and advantages will become apparent from the following.

What is claimed is:

1. A computer implemented method comprising:
   providing a block diagram model in a block diagram modeling and code generation system, the block diagram model being associated with a data object derived from a pre-defined data object class, the pre-defined data object class having one or more default attributes;
   acquiring a definition of one or more user-extended data attributes to be included in a custom data object class which is as a subclass of the pre-defined data object class;
   acquiring values for one or more of the user-extended data attributes from an external data source;

associating the acquired values with the user-extended attributes; and incorporating the acquired values into an instance of the custom data object class, the model inheriting the default attributes and the user-extended attributes from data in the data source instead of the default attributes and the user-extended attributes being specified directly in the model.

2. The method of claim 1, further comprising:

storing the instance of the custom data object class and the custom data object class in a memory of the computer.

3. The method of claim 1, further comprising:

generating executable code from the block diagram modeling and code generation system, the executable code containing attributes of the instance of the custom data object class.

4. The method of claim 3 wherein the executable code runs on a target processor.

5. The method of claim 1, further comprising:

generating executable code from the block diagram modeling and code generation system, the executable code containing values of the attributes of the instance of the custom data object class loaded from an external database.

6. The method of claim 5 wherein the executable code runs on a target processor.

7. The method of claim 1, further comprising:

generating a report containing values of user-extended attributes of the instance of the custom data object class.

8. A computer implemented method comprising:

providing a block diagram model in a block diagram modeling and code generation system, the block diagram model being associated with a data object derived from a pre-defined data object class, the pre-defined data object class having one or more default attributes;

acquiring a definition of one or more user-extended data attributes to be included in a custom data object class that is a subclass of the pre-defined data object class;

generating data objects that are instances of the custom data object class, in the block diagram model, the model inheriting the default attributes and the user-extended attributes from data associated with the model instead of being specified directly in the model;

associating information with the data objects;

providing blocks representing functional entities that operate on the data objects; and generating output from the blocks using values of attributes of the data objects.

9. The method of claim 8, wherein generating data objects includes loading information associated with attributes of the generated data objects from an external database through a data exchange interface.

10. The method of claim 8, further comprising:

generating code using values of attributes of the generated data objects.

11. The method of claim 9, further comprising:

generating a report using values of attributes of the generated data objects.

12. A method of developing an executable block diagram model in a block diagram modeling and code generation system with an associated model-based design environment, the method comprising:

providing a block diagram model in a block diagram modeling and code generation system, the block diagram model being associated with a data object derived from a pre-defined data object class, the pre-defined data object class having one or more default attributes;

generating data objects, which are instances of a custom data object class having default attributes and user-extended attributes, associated with the block diagram model, the model inheriting the default attributes and the user-extended attributes from data associated with the model instead of being specified directly in the model; and making information specified in the data objects available throughout the model-based design environment.

13. The method of claim 12, further comprising:

defining characteristics of an algorithm from values of attributes of the generated data objects.

14. The method of claim 12, further comprising documenting a form and functionality of the algorithm designed in the block diagram modeling system with a report that includes information captured in attributes of the generated data objects.

15. The method of claim 12, wherein generating data objects includes loading values of attributes of the generated data objects from an external database through a data exchange interface.

16. An automatic code generation method, comprising:

providing data for use in a block diagram model in a block diagram modeling and code generation system;

generating data objects, which are instances of a custom data object class that includes user-extended data attributes and default attributes from a pre-defined class, associated with the block diagram model in the block diagram modeling and code generation system, wherein the default attributes and the user-extended data attributes are inherited from data associated with the block diagram model instead of being specified in the model; and generating program code to represent an algorithm designed in an executable block diagram modeling system using the generated data objects, in which characteristics of the algorithm are defined by values of the attributes of the generated data objects.

17. The method of claim 16, further comprising:

defining characteristics of an automatic code generation method and the resulting generated program code based on values of attributes of the generated data objects.

18. The method of claim 16 further comprising:

compiling the generated program code for execution on a target processor.

19. The method of claim 16 further comprising:

combining the generated program code with externally generated and hand-written legacy program code.

20. A computer program product residing on a computer readable medium having instructions stored therein which, when executed by a processor, cause the processor to:

provide a block diagram model in a block diagram modeling and code generation system, the block diagram model being associated with a data object derived from a pre-defined data object class, the pre-defined data object class having one or more default attributes;

acquire a definition of one or more user-extended data attributes to be included in a custom data object class that is a subclass of the pre-defined data object class, including the default attributes and the user-extended data attributes; and generate data objects, which are instances of the custom data object class, associated with the block diagram model in the block diagram modeling and code generation system, the model inheriting the default attributes and the user-extended attributes from data associated with the model instead of being specified directly in the model.

21. A computer program product residing on a computer readable medium having instructions stored therein which, when executed by a processor, cause the processor to:
provide a block diagram model in a block diagram modeling and code generation system, the block diagram model being associated with a data object derived from a pre-defined data object class, the pre-defined data object class having one or more default attributes;
acquire a definition of user-extended data attributes to be included in a custom data object class;
create a custom data object class including the default attributes and the user-extended data attributes;
generate data objects, which are instances of the custom data object class, associated with the block diagram model, the model inheriting the default attributes and the user-extended attributes from data associated with the model instead of being specified directly in the model;
provide at least one block representing a functional entity that operates on at least one of the associated data objects having the recognized at least one of the user-extended or default attributes;
generate output from the blocks using the recognized at least one of the user-extended or default attributes; and
propagate the association between the generated data objects and the executable block diagram model in the block diagram modeling and code generation system to maintain access to values of the default attributes and the user-extended attributes throughout development of the executable block diagram model.

22. A computer program product residing on a computer readable medium having instructions stored therein which, when executed by a processor, cause the processor to:
provide a block diagram model in a block diagram modeling and code generation system, the block diagram model being associated with a data object derived from a pre-defined data object class, the pre-defined data object class having one or more default attributes;
generate data objects, which are instances of a custom data object class having default attributes and user-extended attributes, associated with the executable block diagram model provided in the executable block diagram modeling and code generation system, the model inheriting the default attributes and the user-extended attributes from data associated with the model instead of being specified directly in the model;
propagate the association between the generated data objects and the executable block diagram model to maintain access to values of the default attributes and the user-extended attributes of the generated data objects throughout development of the executable block diagram model; and
simulate a system in an executable block modeling diagram system using the executable block diagram model and at least one of the associated generated data objects having at least one of the user-extended or default attributes.

23. A computer program product residing on a computer readable medium having instructions stored therein which, when executed by a processor, cause the processor to:
provide a block diagram model in a block diagram modeling and code generation system, the block diagram model being associated with a data object derived from a pre-defined data object class, the pre-defined data object class having one or more default attributes;
acquire a definition of one or more user-extended data attributes to be incorporated in a custom data object class that is a subclass of the pre-defined data object class;
create the custom data object class, the custom data object class inheriting the default attributes from the pre-defined data object class;
incorporate the user-extended data attributes into the custom data object class;
extract one or more values for the default attributes and the user-extended data attributes from an external data source through a data exchange interface;
generate one or more data objects, the data objects being instances of the custom data object class and including the default attributes and the user-extended attributes of the custom data object class, the values of the default attributes and the user-extended attributes being established from the extracted values, the data objects related to the executable block diagram model in the executable block diagram modeling and code generation system, the model inheriting the default attributes and the user-extended attributes from the external data source instead of being specified directly in the model; and
associate the one or more data objects with the executable block diagram model.

* * * * *